United States Patent [19]

Jansen

[11] Patent Number: 5,373,406
[45] Date of Patent: Dec. 13, 1994

[54] AUTO LOAD/EJECT SYSTEM FOR TAPE CASSETTE

[75] Inventor: Ornulf Jansen, Behhe, Norway

[73] Assignee: Tandberg Data A/S, Oslo, Norway

[21] Appl. No.: 105,052

[22] Filed: Aug. 12, 1993

[51] Int. Cl.$^5$ .................. G11B 15/00; G11B 5/008
[52] U.S. Cl. ....................... 360/96.5; 360/93
[58] Field of Search ............... 360/96.5, 96.6, 88, 360/90, 93, 96.1, 85, 95; 242/198, 199

[56] References Cited

U.S. PATENT DOCUMENTS

| | | | |
|---|---|---|---|
| 3,610,497 | 10/1971 | Ban | 226/89 |
| 4,096,536 | 6/1978 | Cicatelli | 360/96 |
| 4,484,240 | 11/1984 | Yoshida | 360/96.5 |
| 4,622,606 | 11/1986 | Rudi | 360/96.5 |
| 4,694,360 | 9/1987 | Ohyama et al. | 360/96.5 |
| 4,716,477 | 12/1987 | Uehara | 360/97 |
| 4,864,439 | 9/1989 | Duurland | 360/96.5 |
| 5,036,413 | 7/1991 | Kishimoto | 360/96.5 |
| 5,046,169 | 9/1991 | Tsujino | 360/96.5 |
| 5,088,655 | 2/1992 | Nakanishi | 242/198 |
| 5,162,957 | 11/1992 | Kurosawa et al. | 360/96.5 |

*Primary Examiner*—Robert S. Tupper
*Assistant Examiner*—David L. Ometz
*Attorney, Agent, or Firm*—Hill, Steadman & Simpson

[57] ABSTRACT

A load/eject system for a magnetic tape recorder receiving a magnetic tape cartridge. The system provides a motor/worm gear/pinion and rack transport mechanism which drives a chassis having grippers and lifters engaged in cammed slots for gripping and lifting a cartridge partially inserted into the recorder and transporting the cartridge to an operating position. The system locks the cartridge in proper longitudinal and vertical position for operating. At that operating position, a lost motion spring arrangement imparts a resilient holding force of the cartridge in a longitudinal direction, and deflectable fingers resiliently clamp the cartridge in a select vertical position.

22 Claims, 3 Drawing Sheets

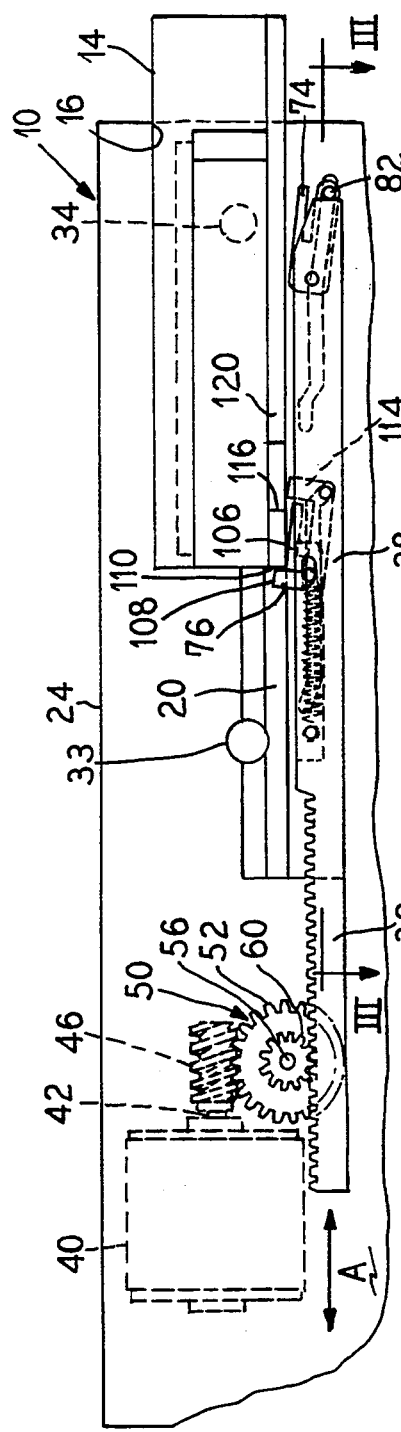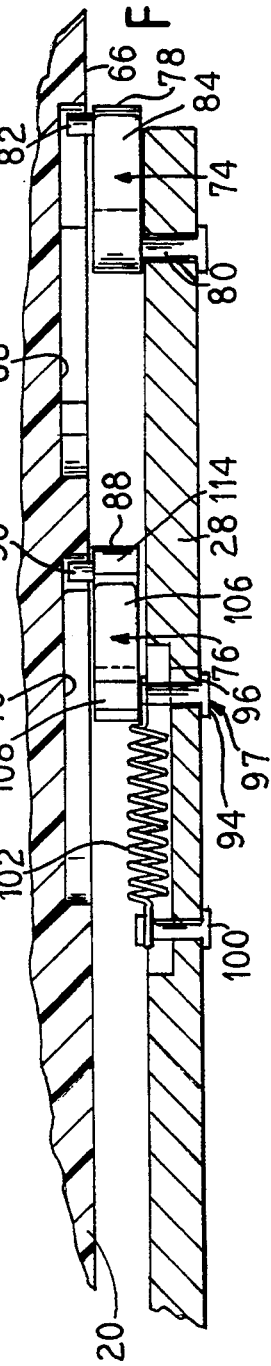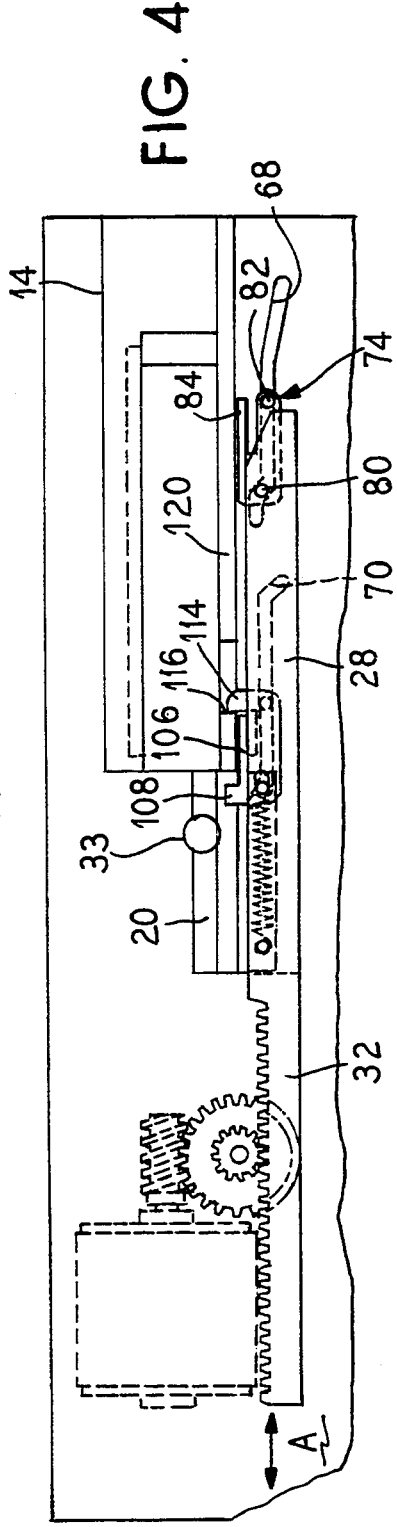

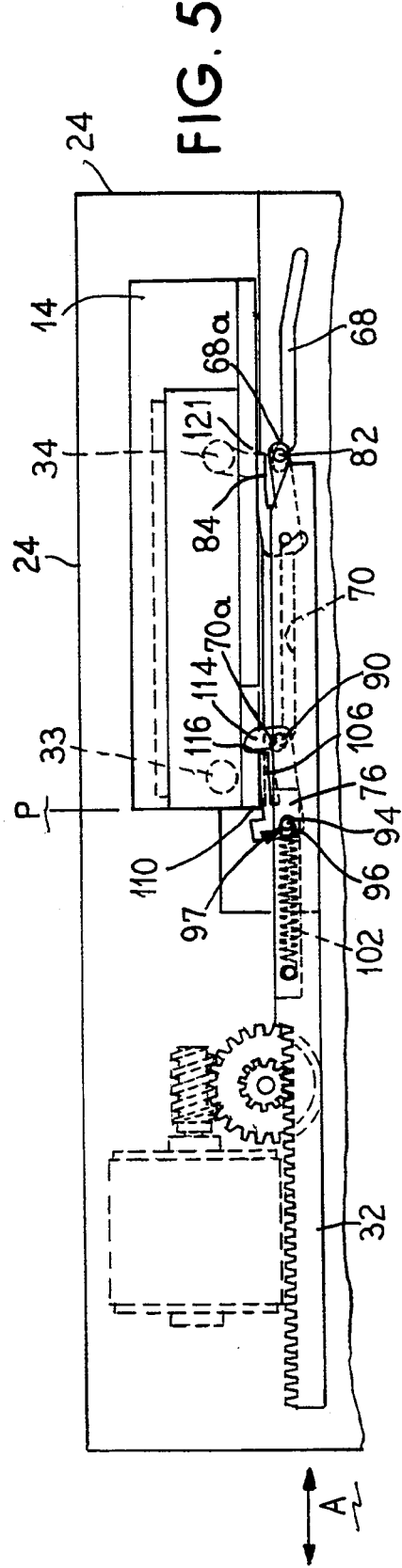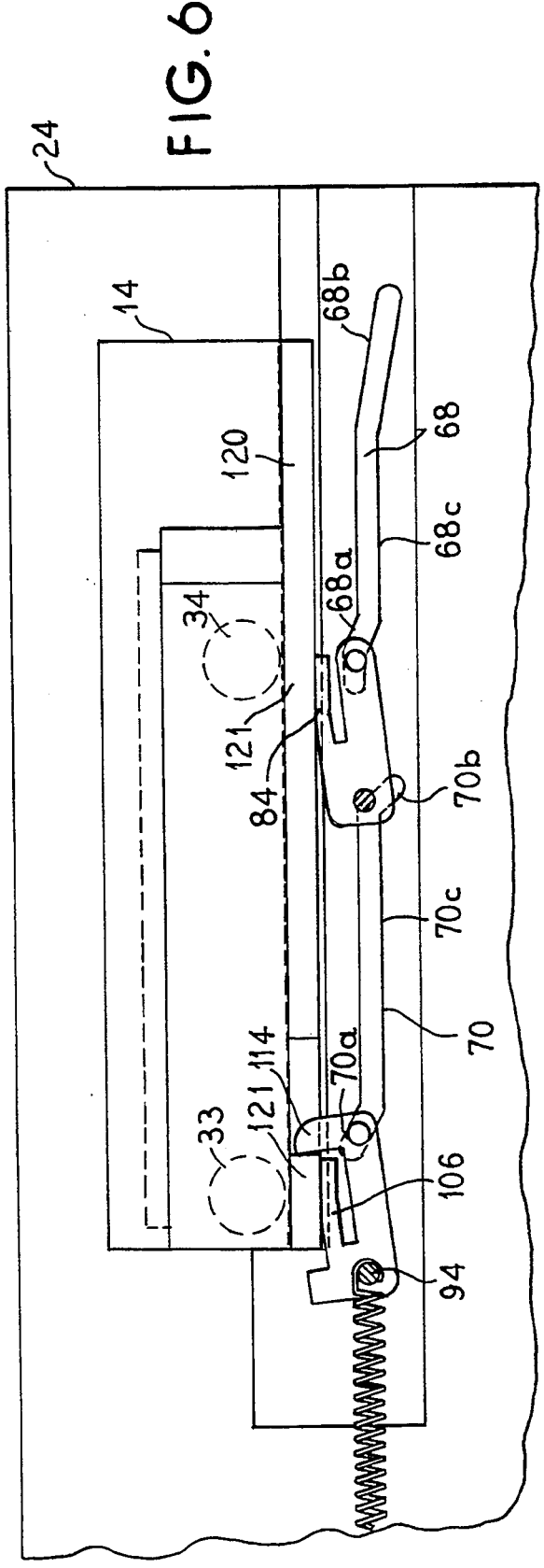

AUTO LOAD/EJECT SYSTEM FOR TAPE CASSETTE

BACKGROUND OF THE INVENTION

The present invention relates to a mechanism for loading a tape cartridge into a read/write unit, and particularly for loading a 3½ inch data cartridge into a magnetic recorder.

In read/write units utilizing a 3½ inch data cartridge, the data cartridge is inserted longitudinally into the read/write unit in a direction toward a longitudinally fixed read/write head which moves vertically to read tracks on the magnetic tape carried in the cartridge. It is known to provide a system wherein the 3½ inch cartridge is manually longitudinally inserted to its operating position within the read/write unit. It is not known in a read/write unit for a 3½ inch data cartridge to provide a mechanical transport system for loading the cartridge into the read/write unit.

A device for drawing such a cartridge into a read/write unit which also resiliently locks the cartridge in proper longitudinal and elevational position is also not known.

SUMMARY OF THE INVENTION

According to the present invention, an auto load/eject system is provided for receiving a cartridge partially inserted into a magnetic recorder, and transporting the cartridge inwardly of the magnetic recorder to a proper position, horizontally and vertically, and locking the cartridge in the proper position securely.

The auto load and eject system provides an electric motor having a worm gear drive extending axially from its drive shaft and engaged to a pinion shaft arranged axially at right angles to the drive shaft. The pinion shaft provides a drive pinion having outer gear teeth engaged to the worm gear for axial rotation of the pinion shaft with the motor drive shaft. The pinion shaft carries two rack pinions which are engaged to parallel racks. The racks extend in the direction of insertion of the cartridge into the magnetic recorder.

The cartridge is loaded onto an internal support within the housing of the magnetic recorder. Arranged with the support are two gripper chassis one having a gripper and a lifter and another having a gripper, the grippers and lifter are pivotably mounted to the respective chassis. Each gripper chassis is connected to, or formed integral with, one of the racks and also extends in the direction of insertion of the cartridge. The gripper chassis are guided for movement in a longitudinal direction (the direction of tape insertion) and the two grippers and the one lifter are guided for both longitudinal movement and for pivoting movement by having pins engaged in movement defining slots arranged generally longitudinally in said internal support.

When the cartridge is partially placed on the internal support, the motor is activated to rotate the worm gear which rotates the rack pinions which draws the racks in a longitudinal direction which transports the two gripper chassis. The grippers provide cartridge engaging hook portions and when the grippers are drawn in a longitudinal direction, the pin of the grippers cause the hook portions to translate upwardly to engage apertures of the cartridge and draw the cartridge along with the gripper chassis in the longitudinal direction. The hook portions prevent retraction of the cartridge with respect to the gripper chassis, and when the cartridge is fully loaded, the hook portions resiliently grip the cartridge to the internal support to fix the longitudinal position of the cartridge. Thus, the cartridge is held firmly on the internal support.

A spring and lost motion connection between the grippers and the gripper chassis provides the resilient gripping of the cartridge to the internal support.

The grippers and the lifter have resilient fingers in the form of cantilevers which are elevated upon longitudinal movement of the grippers and lifter to lift the cartridge during its longitudinal travel during loading. The internal support provides three fixed elevation locators at positions corresponding to the locations of the grippers and lifter above an exposed ledge on the bottom wall of the cartridge. The locators set the proper elevation of the cartridge. The longitudinal movement of the chassis thus elevates the fingers and lifts the cartridge, and further longitudinal movement of the chassis causes the fingers to be resiliently deflected to cause a tight grip of the ledge between the fingers and the locators.

For retraction of the cartridge, the grippers provide abutments which face the front edge of the cartridge, and upon reverse rotation of the motor the racks are driven in a reverse direction and the chassis moves the grippers and lifter to lower the cartridge. The abutment of the grippers drive the cartridge with respect to the internal support in the longitudinal direction.

BRIEF DESCRIPTION OF THE DRAWINGS

FIG. 2 is a sectional view taken generally along line II—II of FIG. 1 of the load/eject system of the present invention;

FIG. 3 is a sectional view taken generally along line III—III of FIG. 2;

FIG. 4 is an elevational view of the system of FIG. 2 with the cartridge further progressed to a nearly loaded position;

FIG. 5 is an elevational view of the system of FIG. 2 with the cartridge in a fully loaded position;

FIG. 6 is an enlarged elevational view of the system as shown in FIG. 5;

DETAILED DESCRIPTION OF THE PREFERRED EMBODIMENTS

Figure 1:
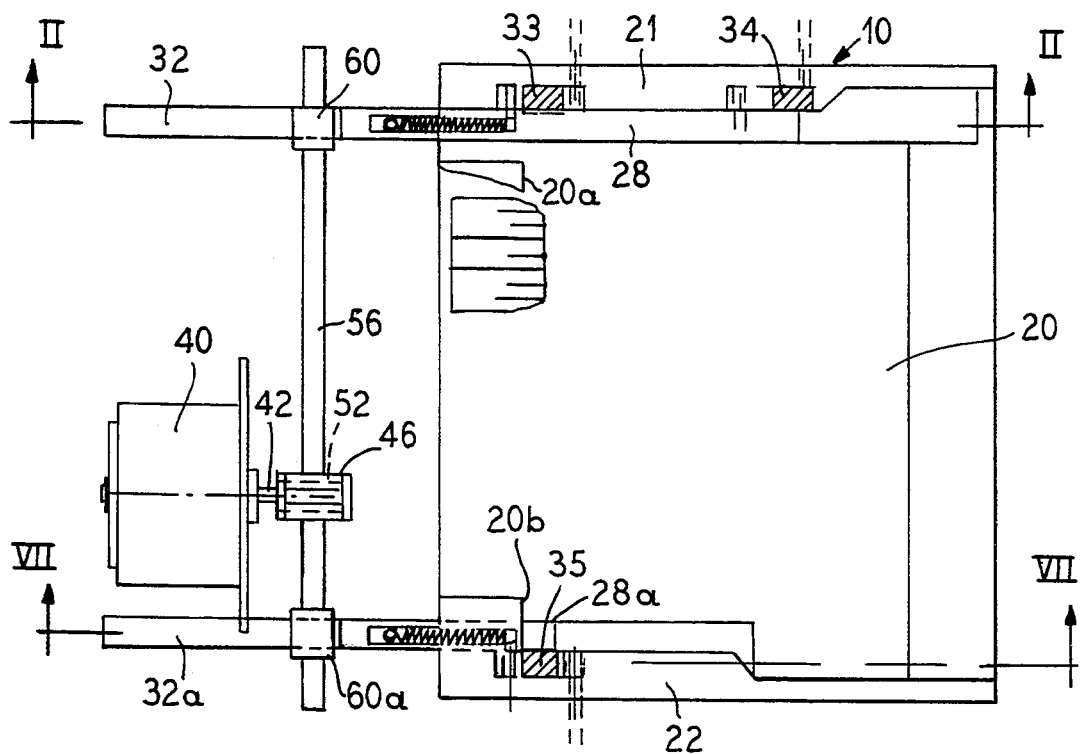
FIG. 1 is a plan view of the load/eject system of the present invention.

FIG. 1 illustrates a read/write unit such as a magnetic recorder 10 for receiving a tape cartridge 14 through an opening 16 of the recorder (shown in FIG. 2). A cartridge support 20 is provided for receiving the tape cartridge. The support provides side walls 21, 22. Mounted for sliding movement with respect to the side walls and arranged adjacent thereto is a first gripper chassis 28 and a second gripper chassis 28a. The gripper chassis 28, 28a are connected to racks 32, 32a respectively. The support 20 further provides three locators 33, 34, 35, the two locators 33, 34 located in the vicinity of the first gripper chassis 28 and the third locators 35 located in the vicinity of the second gripper chassis 28a. The three locators 33, 34, 35 define a horizontal plane at a specified elevation, corresponding to the desired plane of the tape cartridge when fully inserted in operating position. The support structure 20 further provides two abutment walls 20a, 20b which are arranged to be abutted by the cartridge 14 when inserted to the proper longitudinal position corresponding to the operating position.

A motor 40 is arranged toward a backside of the read/write unit 10 and has a drive shaft 42 driving a worm gear 46 which is arranged above and engaged with a drive pinion 52 mounted to rotate with a pinion shaft 56 which spans laterally between the first and second racks 32, 32a. Above and engaged to the rack 32 is a first rack pinion 60, and arranged above and engaged to the second rack 32a is a second rack pinion 60a. As illustrated more clearly in, for example, FIG. 2, rotation of the pinion 60, 60a drive the racks 32, 32a in longitudinal direction.

FIG. 2 illustrates the read/write unit such as the magnetic recorder 10 receiving the tape cartridge 14 through the opening 16 of the recorder. The cartridge 14 is loaded onto the cartridge support 20 which is stationary with respect to a housing 24 of the recorder 10. Mounted for sliding movement with respect to the support 20 is the gripper chassis 28 which is mounted to, or formed integral with, the rack 32 extending toward a back of the recorder 10. The cartridge support 20 provides the locators 33, 34 fixed for longitudinal and vertical movement with respect to the support 20.

Shown in phantom for clarity of description is the electric motor 40 having the drive shaft 42 upon which is mounted the worm gear 46. The worm gear 46 engages the drive pinion 52 mounted on the shaft 56. The shaft 56 mounts the first rack pinion 60 which engages the rack 32. The motor 40 and the shaft 56 are mounted stationary within the housing 24. Upon rotation of the drive shaft 42 of the motor 40, the worm gear 46 and the drive pinion 52 cause rotation of the shaft 56 and the first rack pinon 60 which in turn causes movement of the rack 32 and hence the chassis 28 along the direction A.

On a side 66 of the side wall 21 of the support 20 facing the chassis 28, are arranged a first cammed slot 68 and a second cammed slot 70. Mounted pivotally on the gripper chassis 28 is a lifter 74 and a gripper 76. The lifter 74 comprises a body portion 78 mounted on a rotatable pin 80 on the gripper chassis 28 and having a follower pin 82 extending therefrom and into the slot 68. On top of the body portion 78 is mounted a flexible support finger 84. The gripper 76 provides a body portion 88 and a follower pin 90 mounted thereto and registering with the slot 70. The body portion 88 is mounted to the gripper chassis 28 via a rotatable pin 94 which is mounted in a slot 96 creating a lost motion connection 97 between the pin 94 and the slot 96.

A stationary pin 100 is mounted to the gripper chassis 28 forward of the slot 96 and a spring 102 is connected between the stationary pin 100 and the rotating pin 94, urging the rotating pin 94 to a front side of the slot 96. The body portion 88 of the gripper 76 also comprises a flexible lift finger 106 and an upstanding abutment 108.

Figure 7:
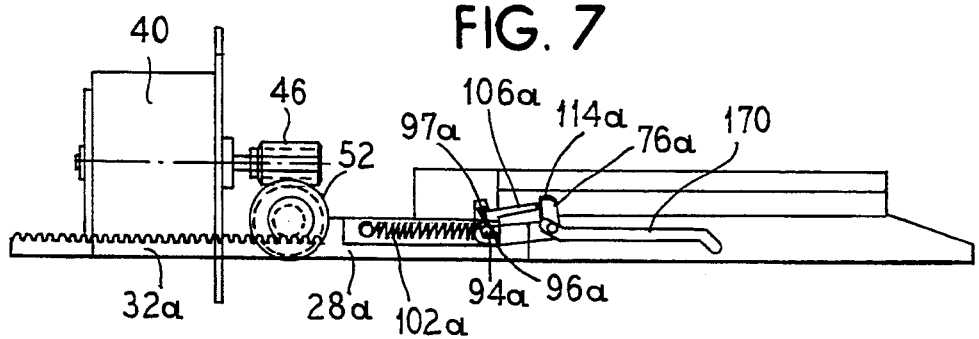
FIG. 7 is a sectional view taken generally along line VII—VII of FIG. 1.

As shown in FIG. 2, when the cartridge 14 is positioned on the support 20, a front wall 110 of the cartridge 14 abuts the upstanding abutment 108 of the grippers 76, 76a (shown in FIG. 7). A button or other switch can be set to trigger the motor 40 (mechanism or switch not shown) to draw the racks 32, 32a to the left of FIG. 2. By thus drawing the rack 32 to the left the gripper chassis 28, 28a are also drawn to the left and the pin 90 rides upward in slots 70, 170 (170 shown in FIG. 7) causing a counterclockwise rotation of the grippers 76, 76a. Hook portions 114, 114a of the gripper body 88 extends upward into apertures 116, 116a of the cartridge 14. The abutments 108, 108a act, to locate the cartridge with the apertures 116, 116a in registry with the hook portions 114, 114a. Upon further translation of the racks 32, 32a and gripper chassis 28, 28a, the finger portions 106, 106a abut and lift a bottom wall 120 of the cartridge 14 and the hook portions 114, 114a exert a pulling force on the apertures 116, 116a in the direction A.

The lifter 74 progresses with the pin 82 following the slot 68 which causes the finger portion 84 to lift the bottom wall 120 of the cartridge 14 to a higher elevation with respect to the support 20. Thus, for further progression of the cartridge 14 in the direction A, the cartridge is not sliding on the support 20, but rather is held elevated by the finger portions 106, 84, 106a (106a as described with respect to FIG. 7). This insures a quiet reduced friction delivery of the cartridge 14 to its operating position.

FIG. 4 shows the cartridge 14 progressing to the left along the direction A. FIG. 5 shows the cartridge 14 once it has reached its operating position. The pins 82, 90 have progressed upwardly in inclined regions 68a, 70a of the slot 68, 70 respectively. This upward movement of the pins causes a vertical locking of the cartridge 14 between the flexible fingers 106, 84 and the locators 33, 34. The locators 33, 34 have their elevations set to cause compression of a ledge 121 of the bottom wall 120 between the locators and the gripper 76 and the lifter 74. Simultaneously, the gripper 76a of the chassis 28a is pivoted by pin movement through the slot 170 to cause compression of the ledge 121 against the locator 35 as described below with respect to FIG. 7.

As shown in FIG. 5 and referring to FIGS. 1 and 7, front abutment walls 20a, 20b of the support structure 20 have been reached and abutted by the front wall 110 of the cartridge 14. This represents the terminal longitudinal position P of the cartridge 14 in the direction A. However, because of the lost motion connection 97, 97a between the pins 94, 94a and the slots 96, 96a respectively, a slight further movement of the racks 32 32a is allowed by the slots 96, 96a. This causes an elongation of the springs 102, 102a which exert pulling force on the pins 94, 94a and thus the grippers 76, 76a and thus the hooks 114, 114a against the apertures 116, 116a. As a result of this force, the cartridge 14 is held tightly against the abutments 20a, 20b of the support structure 20. Additionally, longitudinal misalignment between the laterally spaced grippers 76, 76a can be accommodated by the lost motion connections. Such a misalignment caused by, for example, cumulative mechanical tolerances, can otherwise cause one side of the front wall 110 to impact one of the abutment walls 20a, 20b before the respective other abutment wall is abutted. The lost motion connections allow both racks to continue moving until the respective other abutment wall is impacted. Also, the lost motion connections and springs allow a predetermined and uniform gripping force of the cartridge in the longitudinal direction.

FIG. 6 shows the slot 70 and 68 in more detail. The slot 70 first comprises a rapidly rising portion 70b for displacing the hook 114 into position to grip the cartridge 14. Following the rapid rising portion 70b is a generally flat portion 70c which allows for the translation of the cartridge 14 with respect to the support structure 20. Following the relatively flat region 70c is the rising portion 70a for vertically locking the cartridge in place. The slot 68 comprises a gradually rising region 68b which allows the gradual elevating of the cartridge bottom 120 by the lift finger 84 followed by a generally flat region 68c for translation of the cartridge 14 with respect to the support structure 20, and continuing to the rising portion 68a for flexing the finger portion 84 against an underside of the bottom wall 120 of the cartridge 14. At the operating position, the rising portions 68a, 70a of the slots and the vertical placement of the locators 33, 34 causes the fingers 84, 106 to be vertically deflected. Thus, a resilient clamping of the ledge 121 between the fingers 84, 106 and the locators 33, 34 is effected at the proper operating position. An identical arrangement exists at the slot 170 causing a resilient clamping of the ledge between the finger 106a and the locator 35.

Figure 8:
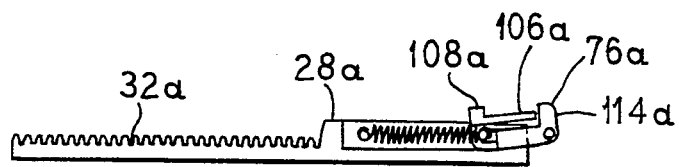
FIG. 8 is an elevational view of a gripper, chassis and rack from FIG. 7.

FIGS. 7 and 8 show the operation of the second chassis 28a connected to the second rack 32a. Mounted on the second chassis 28a is the second gripper 76a of substantially identical configuration to the first gripper 76. The second gripper 76a is likewise connected to the second chassis 28a with an identical lost motion connection 97a using the pin 94a residing in the slot 96a and urged by the spring 102a, especially when the cartridge 14 is stopped by the abutments 20a, 20b and the rack 32a continues to move a short distance to stretch the spring 102a. The slot 170 is provided which is identical to the slot. 70 (in a mirror image sense) and allows for the gripper 76a to elevate and translate together in a parallel path upon the translation of the two racks 32, 32a. Thus, the second gripper 76a operates to grip the cartridge at the second parallel and spaced apart aperture 116a (not shown) of the cartridge against the abutment walls 20a, 20b by a hook portion 114a, , and lift the cartridge by the flexible finger portion 106a. It is noted that a second lifter is not used on the gripper chassis 28a in contrast to the chassis 28. Since three points in space define a plane, only three vertical locators 33, 34, 35 are desired or needed and correspondingly, three flexible fingers 106, 106a, and 84 are required each in the vicinity of the locators 33, 34, 35 to hold the cartridge at a desired plane.

When the cartridge is to be ejected, the motor 40 is caused to rotate in reverse direction, the racks 32, 32a are moved to the right in FIG. 1 and the abutments 108, 108a pushes the cartridge in reverse longitudinal direction as the grippers and lifter rotate clockwise to lower the cartridge onto the support structure.

Although the present invention has been described with reference to a specific embodiment, those of skill in the art will recognize that changes may be made thereto without departing from the scope and spirit of the invention as set forth in the appended claims.

I claim as my invention:

1. A tape cartridge load mechanism for loading a tape cartridge into operating position in a magnetic read/write unit, comprising:
    a support structure mounted within said read/write unit;
    a chassis mounted for sliding movement in a longitudinal direction with respect to said support structure;
    means for engaging said cartridge partially inserted into said read/write unit, said means for engaging mounted for movement with said chassis and simultaneously actuated by sliding movement of said chassis with respect to said support structure;
    said means for engaging for longitudinally translating the cartridge, for lifting the cartridge, and for maintaining a static urging of said cartridge against said support structure in the longitudinal direction once in the operating position;
    motive means for sliding said chassis with respect to said support structure.

2. The mechanism according to claim 1, wherein said means for engaging comprises a gripper pivotably mounted at a pivot connection to said chassis and having a hook portion at an end thereof engageable into an aperture of said cartridge upon pivoting of said gripper, said gripper pivoted by differential movement between said support structure and said chassis.

3. The mechanism according to claim 2, wherein said gripper comprises a pin at a distance from the pivot connection to said chassis, and said support structure comprises a slot, said pin registered in said slot for movement therethrough, said slot configured to engage said hook portion to said cartridge upon translation of said chassis with respect to said support structure during cartridge loading.

4. The mechanism according to claim 1, wherein said support structure comprises a vertical movement stop, said means for engaging statically urging said cartridge against said stop when said cartridge is in said operating position.

5. The device according to claim 4, wherein said means for engaging comprises a lifter mounted for rotation at a pivot point to said chassis and having a pin at a distance from said pivot point, and a slot formed into said support structure, said pin registered in said slot for movement therethrough, said slot configured such that differential sliding movement between said chassis and said support structure causes said pin to move through said slot and said lifter to lift said cartridge.

6. The mechanism according to claim 1, wherein said means for engaging comprises a lift lever having a member arranged below the cartridge, the member moved upward by said sliding movement of said chassis to lift said cartridge, and said support structure comprises an elevation stop above a portion of the cartridge, said member adapted to resiliently compress the portion against the stop.

7. The device according to claim 1, wherein said means for engaging comprises:
    a pivotable hook for engaging the cartridge and having a first pin extending therefrom laterally, and said support structure comprises a first slot, said first pin registered into said first slot, said first slot having an inclined first region for lifting said hook when said chassis slides laterally with respect to said support structure; and
    a lift lever pivotably mounted to said chassis and having a second pin extending therefrom, and said support structure comprises a second slot, said second pin registered into said second slot, and differential sliding movement between said chassis and said support structure causes said second pin to move through said second slot and pivot said lift lever to lift said cartridge.

8. The device according to claim 7, wherein said second slot comprises a rising region in a direction of loading of said cartridge, longitudinal translation of said chassis with respect to said support structure causing said second pin to proceed vertically in said rising region pivoting said lift lever, said lift lever comprises a flexible finger portion underlying said cartridge, and said support structure comprises an elevation stop, said flexible finger portion deflects to resiliently hold said cartridge in vertical position against said elevation stop.

9. The device according to claim 1, wherein said motive means comprises an electric motor, a pinion, and a rack, said rack attached to said chassis, said pinion engaged to said rack, and said electric motor mechanically driving said pinion in a first rotational direction for sliding said chassis in a first longitudinal direction, and for rotating said pinion in a second rotational direction to drive said chassis in a second longitudinal direction.

10. The device according to claim 1, wherein said means for engaging comprises a gripper pivotably mounted at a pivot connection to said chassis and having a hook portion at an end thereof engageable into an aperture of said cartridge upon pivoting of said gripper, said gripper pivoted by said sliding movement of said chassis, and wherein said support structure comprises an abutment and said cartridge is transported by said chassis until interfering with said abutment, and said hook portion is resiliently urged in a longitudinal direction with respect to said chassis, said hook portion of said gripper resiliently urging said cartridge against said abutment.

11. An apparatus for loading a magnetic tape cartridge into a magnetic tape read/write unit, comprising:
a housing having an opening;
a support structure mounted stationary within said housing for receiving a tape cartridge partially inserted into said opening of said housing;
a first slidable chassis mounted adjacent said support structure, said first slidable chassis having a pivotable hook lever mounted thereon, said pivotable hook lever having a pin extending therefrom toward said support structure and a hook portion arranged to be engageable with the cartridge;
said support structure having a cammed slot for receiving said pin and defining the longitudinal path of said pin for determining the orientation of said hook lever as said first slidable chassis is moved with respect to said support structure, said slot providing that said hook portion is lowered upon entry of said cartridge onto said support structure and pivoted upwardly to engage the cartridge during transport of said first slidable chassis in a longitudinal direction with respect to said support structure during cartridge loading; and
motive means for transporting said first slidable chassis in a longitudinal direction with respect to said support structure.

12. The apparatus according to claim 11, wherein said pivotable hook lever comprises a pivot point attachment to said chassis, and an abutment arranged at a distance from said pivot point, said abutment arranged to be in position to be abutted by a cartridge partially inserted onto said support platform and locating said hook portion in registry with an aperture formed in said cartridge.

13. The apparatus according to claim 12, wherein when said motive means reverses direction and progresses said first slidable chassis oppositely for cartridge ejection, said abutment presses a front edge of said cartridge, and said pin progresses through said cammed slot to force said cartridge outwardly toward said opening of said housing.

14. The apparatus according to claim 11 further comprising a lift lever pivotally mounted to said first slidable chassis and arranged at a distance from said pivotable hook lever along the longitudinal direction of said first slidable chassis, said lift lever having a pivot pin connection to said first slidable chassis and a pin follower extending therefrom toward said support structure; and
said support structure comprises a second slot, said pin follower registered in said second slot, said second slot configured to pivot said lift lever upon progression of said first slidable chassis with respect to said support structure in the longitudinal direction, said lift lever having a flexible finger portion arranged facing a bottom of said cartridge for lifting said cartridge upon pivoting of said pivotable lift lever.

15. The apparatus according to claim 11, wherein said motive means comprises a motor, a rack, and a pinion said motor driving said pinion to longitudinally progress or retract said rack.

16. The apparatus according to claim 11, wherein said pivotable hook lever further comprises a flexible finger portion on a top side thereof for engaging a portion of said cartridge held thereby, and said support structure comprises an elevation locator on a side of said portion opposite said flexible finger portion, and said cammed slot comprises a rising channel portion toward a terminal end thereof in a longitudinal direction of loading, said rising channel portion causing said pin to pivot the hook lever and said flexible finger portion to resiliently grip said cartridge between said flexible finger portion and said elevation locator.

17. The apparatus according to claim 16 further comprising a lift lever pivotally mounted to said first slidable chassis and arranged at a distance from said pivotable hook lever along the longitudinal direction of said first slidable chassis, said lift lever having a pivot pin connection to said first slidable chassis and a pin follower extending therefrom toward said support structure;
said support structure comprises a second slot, said pin follower registered in said second slot, said second slot configured to pivot said lift lever upon progression of said first slidable chassis with respect to said support structure in the longitudinal direction, said lift lever having a flexible finger portion arranged facing a bottom of said cartridge for lifting said cartridge upon pivoting of said lift lever; and
further comprising a second slidable chassis mounted adjacent said support structure, said second slidable chassis slidable in parallel simultaneous movement with said first slidable chassis, said second slidable chassis having a pivotable flexible finger portion arranged facing a bottom of said cartridge for lifting said cartridge upon pivoting of said flexible finger portion, and means for transforming differential sliding movement between said second slidable chassis and said support structure into a pivoting motion of said pivotable flexible finger portion.

18. The apparatus according to claim 17, wherein said pivotable flexible finger portion further comprises a hook lever pivotable to engage a second aperture in said cartridge and translatable in a longitudinal direction with said second slidable chassis to transport said cartridge.

19. The apparatus according to claim 18, wherein said hook portion and said second hook portion are connected to said first slidable chassis and said second slidable chassis respectively with lost motion spring biased connections and said support structure provides a longitudinal stop, said first slidable chassis and said second slidable chassis transporting said cartridge until the cartridge abuts said longitudinal stop wherein said first slidable chassis and said second slidable chassis are further moved in incremental amount to cause said hook portion and said second hook portion to urge said cartridge against said stop with a predetermined spring force.

20. An apparatus for loading a magnetic tape cartridge into a magnetic tape read/write unit, comprising:
   a housing having an opening;
   a support structure mounted stationary within said housing for receiving a tape cartridge partially inserted into said opening of said housing;
   a slidable chassis assembly mounted adjacent said support structure, said slidable chassis having hook means for engaging at least one aperture of said tape cartridge, said hook means actuated for engagement by sliding movement of said chassis assembly in a loading direction with respect to said support structure, and lift means for lifting said tape cartridge to operating elevation during longitudinal transport of said tape cartridge in a loading direction, and means for resiliently clamping said tape cartridge into operating position.

21. The apparatus according to claim 20, wherein said means for clamping comprises at least one spring connected to said chassis assembly and to said hook means for resiliently urging the hook means in the longitudinal direction against said longitudinal stop of said support structure, and
   a spring means for urging said cartridge in a vertical direction against a vertical stop provided by said support structure.

22. The apparatus according to claim 21, wherein said spring means comprise three resilient lifters spaced apart and defining a plane, and said vertical stops oppose each of said lifters through a planar portion of said cartridge.

* * * * *